United States Patent
Gerardo Castro et al.

(10) Patent No.: US 11,164,015 B2
(45) Date of Patent: Nov. 2, 2021

(54) SIMULTANEOUS DIAGNOSIS AND SHAPE ESTIMATION FROM A PERCEPTUAL SYSTEM DERIVED FROM RANGE SENSORS

(71) Applicant: Ford Global Technologies, LLC, Dearborn, MI (US)

(72) Inventors: Marcos Paul Gerardo Castro, Mountain View, CA (US); Jinesh Jain, Palo Alto, CA (US); Bruno Sielly Jales Costa, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 15/974,436

(22) Filed: May 8, 2018

(65) Prior Publication Data

US 2019/0347494 A1    Nov. 14, 2019

(51) Int. Cl.
G06K 9/00 (2006.01)
B60W 50/02 (2012.01)

(52) U.S. Cl.
CPC ..... G06K 9/00805 (2013.01); B60W 50/0205 (2013.01); B60W 2050/0215 (2013.01); B60W 2420/52 (2013.01)

(58) Field of Classification Search
CPC ................. G06K 9/00805; B60W 50/0205
See application file for complete search history.

(56) References Cited

U.S. PATENT DOCUMENTS

| 9,117,278 B2 | 8/2015 | Ehrlich |
| 2010/0309304 A1 | 12/2010 | Chalmond |
| 2011/0001840 A1* | 1/2011 | Ishii .................... G03B 13/36 348/222.1 |
| 2014/0355886 A1* | 12/2014 | Konishi ............... G06K 9/4609 382/195 |
| 2015/0235380 A1* | 8/2015 | Hayashi ............. G06K 9/00624 382/103 |
| 2016/0306040 A1* | 10/2016 | Hunt ..................... G01S 7/6272 |
| 2017/0061253 A1 | 3/2017 | Burgos |
| 2017/0293894 A1* | 10/2017 | Taliwal ............. G06K 9/00671 |
| 2017/0358061 A1* | 12/2017 | Choi ..................... G06T 3/4053 |
| 2018/0012082 A1* | 1/2018 | Satazoda ........... G06K 9/00805 |
| 2019/0137280 A1* | 5/2019 | Ghadiok ................. G06T 7/73 |

(Continued)

FOREIGN PATENT DOCUMENTS

| CN | 103021021 A | 4/2013 |
| DE | 102004038761 A1 | 2/2006 |
| JP | 2009264956 A | 11/2009 |

*Primary Examiner* — Jess Whittington (74) *Attorney, Agent, or Firm* — David R. Stevens; Stevens Law Group (57) ABSTRACT

Systems, methods, and devices for estimating a shape of an object based on sensor data and determining a presence of a fault or a failure in a perception system. A method of the disclosure includes receiving sensor data from a range sensor and calculating a current shape reconstruction of an object based on the sensor data. The method includes retrieving from memory a prior shape reconstruction of the object based on prior sensor data. The method includes calculating a quality score for the current shape reconstruction by balancing a function of resulted variances of the current shape reconstruction and a similarity between the current shape reconstruction and the prior shape reconstruction.

20 Claims, 6 Drawing Sheets

(56) References Cited

U.S. PATENT DOCUMENTS

| | | | | |
|---|---|---|---|---|
| 2019/0220678 A1* | 7/2019 | Guo | ............... | G06K 9/6218 |
| 2019/0220967 A1* | 7/2019 | Bhatt | ............... | G06K 9/6218 |
| 2019/0303686 A1* | 10/2019 | Guo | ............... | G06K 9/3241 |
| 2020/0226413 A1* | 7/2020 | Ye | ............... | G06K 9/6215 |

* cited by examiner

SIMULTANEOUS DIAGNOSIS AND SHAPE ESTIMATION FROM A PERCEPTUAL SYSTEM DERIVED FROM RANGE SENSORS

TECHNICAL FIELD

The disclosure relates generally to systems, methods, and devices for diagnosing or detecting a fault in a perception system. The disclosure particularly relates to such systems, methods, and devices for estimating a shape of an object based on range data and diagnosing or detecting a faulty point in the range data.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. Accurate and fast determination of shapes of objects surrounding the vehicle is often necessary to enable automated driving systems or driving assistance systems to safely navigate roads or driving routes. Additionally, accurate and fast determination of a fault or failure in a perception system is often necessary when, for example, a perception sensor cannot accurately obtain data due to environmental factors or other faults.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

The task of estimating a shape of an object can be imperative in many robotics applications and autonomous driving applications where the geometry of an object may help identify its class, position, location, heading, geometry, intent, and so forth. For example, in field robotics, estimating the shape of an object may be challenging where sensor data is noisy, incomplete, and sparse. Additionally, challenging environmental conditions such as the presence of fog, smoke, and dust can create occlusions or perceptual faults or failures in sensor data. Such perceptual faults can cause a perception system to fail to recover the shape of the object. It should be appreciated that such failures may lead to catastrophic consequences in the perception system of a robot or autonomous vehicle and may risk the integrity of the robot platform or autonomous vehicle and its surroundings.

In the present disclosure, Applicant presents systems, methods, and devices for interpreting objects in an environment under varying environmental conditions. Applicant presents robust perception systems capable of evaluating and validating the quality of data received by a sensing modality. Applicant further presents perception systems, methods, and devices configured to anticipate sensor failure and faults.

Before the methods, systems, and devices for diagnosing a presence of a fault or a failure in a perception system are described and disclosed, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

According to one embodiment of the disclosure, a method for detecting and/or diagnosing a fault or a failure in a perception system is disclosed. The method includes receiving sensor data from a range sensor and calculating a current shape reconstruction of an object based on the sensor data, wherein the object is detectable by the range sensor. The method includes retrieving from memory a prior shape reconstruction of the object based on prior sensor data. The method includes calculating a quality score for the current shape reconstruction by balancing a function of resulted variances of the current shape reconstruction and a similarity between the current shape reconstruction and the prior shape reconstruction.

An embodiment of the disclosure provides novel systems, methods, and devices for diagnosing the presence of a fault or a failure in a perception system at the level of object or scene representation by evaluating the quality of shape reconstructions derived from range data from a single sensor. It should be appreciated that the same systems and methods may be applied to data from multiple sensors.

Additionally, the systems, methods, and devices are configured for object identification and recovery based on prior knowledge of the object or scene representation, and this may be particularly applied in instances including data noise, sparseness, or occlusions caused by environmental or other factors.

An embodiment of the disclosure utilizes single sensing modalities to evaluate the quality of scenes using a cost function based on mutual information. An embodiment of the systems, methods, and devices disclosed herein utilize LIDAR sensing data and/or radar sensing data to estimate a shape of an object and evaluate the presence of faults using a cost function that may utilizing only a single sensing modality or may utilize multiple sensing modalities. The systems, methods, and devices disclosed herein are not restricted to radar sensors and are agnostic to the type of sensor. In an embodiment, the systems, methods, and devices are suitable to be used for data from any range sensing modality including for example, a stereo camera, LIDAR, ultrasonic sensing, and so forth. The systems, methods, and devices may leverage the benefits of data from various sensing modalities according to that data's capabilities, and the systems, methods, and devices may be modified as per the data provided by the sensor.

In an embodiment, an evaluation method for detecting a presence of a fault or a failure in a perception system utilizes reconstruction information such as spatial parameters including two-dimensional and three-dimensional coordinates, uncertainty including variance of an estimated shape of an object, and temporal coherence including mutual information across object reconstruction. The evaluation method considers the structure of an object and the uncertainty and the coherence across the data from one or more sensing modalities. Such evaluation methods may reduce false alarms caused by noise and sparseness and may further reduce false negatives caused by occlusions.

Figure 1:
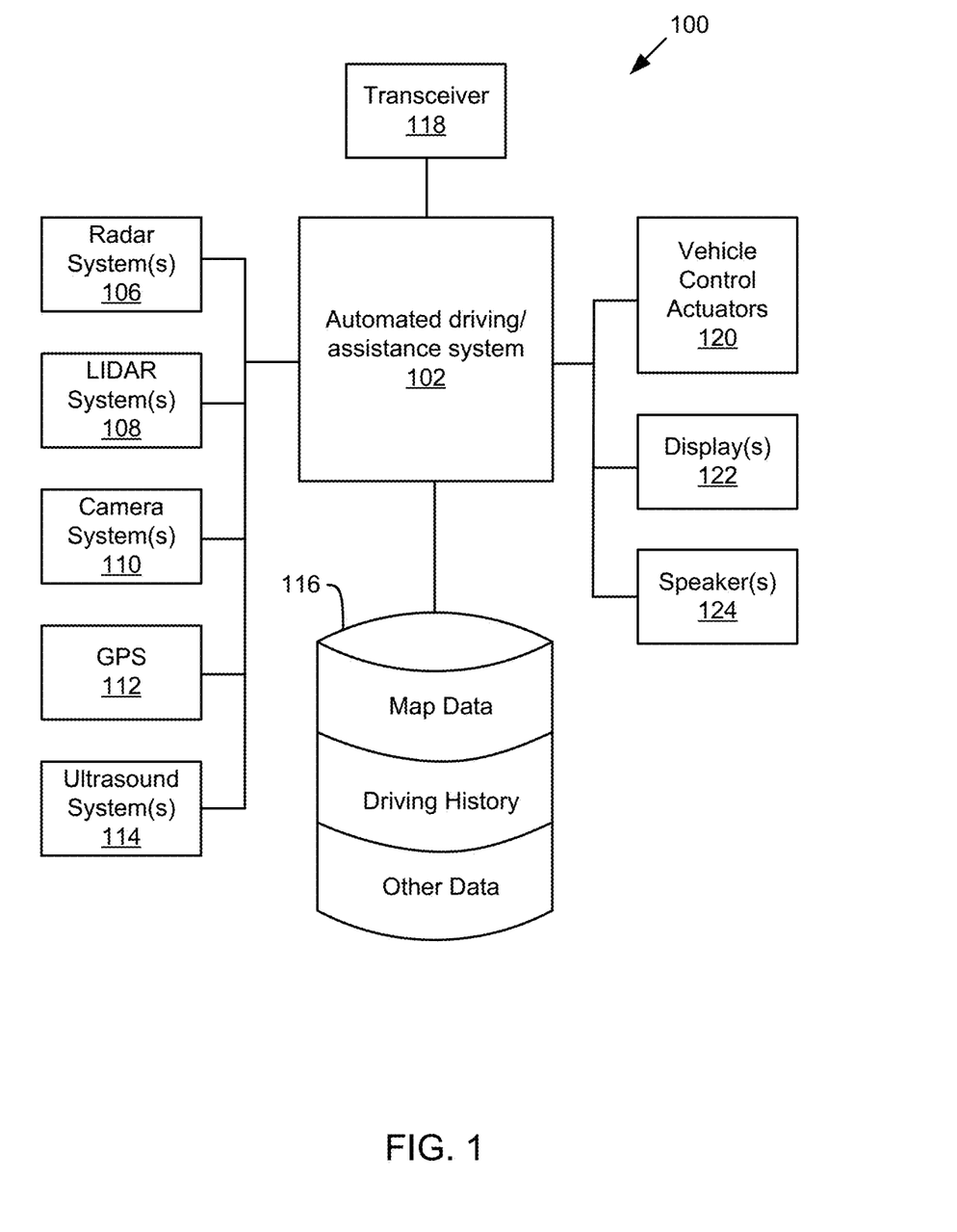
FIG. 1 is a schematic block diagram illustrating an implementation of a vehicle control system that includes an automated driving/assistance system, according to one implementation.

Referring now to the figures, FIG. 1 illustrates an example vehicle control system 100 that may be used to automatically localize a vehicle. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

In one embodiment, the vehicle control system 100 includes a localization component 104 to determine a location of the vehicle with respect to map, roadway, or the like. For example, the localization component 104 may use an on-board camera to localize the vehicle with respect to a prior created or obtained map. In one embodiment, the localization component 104 may enable the vehicle control system 100 to localize the vehicle without using active sensors such as LIDAR or radar, which emit energy in the environment and detect reflections. The map may include a vector-based semantic map or a LIDAR intensity map. A projected top-down image derived from the camera is created and compared to either a previously made vector or a LIDAR intensity map. The comparing process can be done by using technique like mutual information or by comparison techniques that provide a best-fit relative position.

Figure 2:
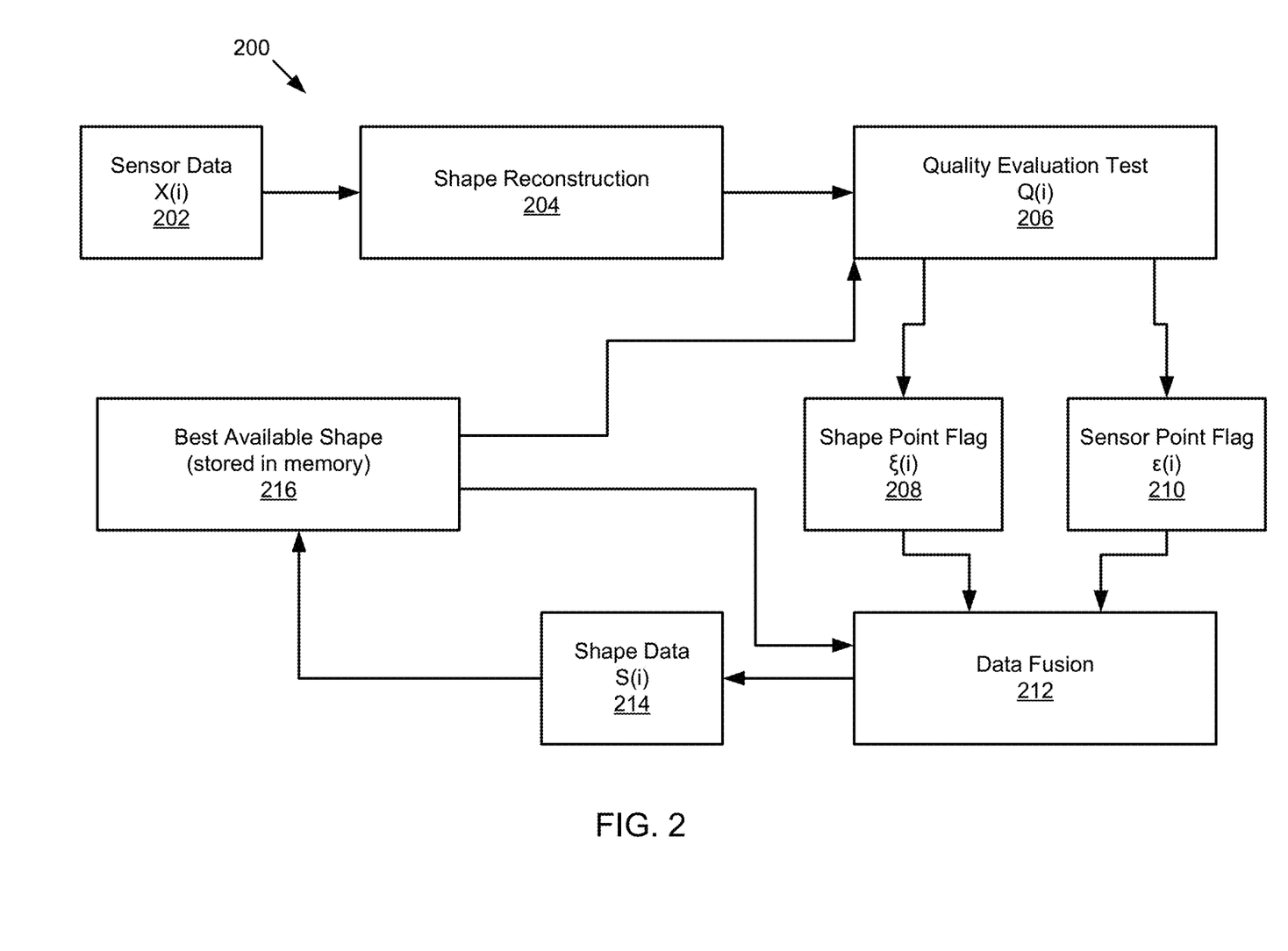
FIG. 2 illustrates a schematic block diagram of an example process flow for estimating a shape of an object and detecting a fault in a perception system, according to one implementation.

FIG. 2 illustrates a schematic diagram of an example process flow 200 for diagnosing and/or detecting a failure or a fault in a perception system. An output of the process flow 200 includes a most trusted estimated shape of an object for a time period. An additional output of the process flow 200 includes an indication whether a point received from a sensor is faulty or non-faulty. An input of the process flow 200 includes a set of sensor observations corresponding to two-dimensional and three-dimensional points at a time instance.

The process flow 200 includes receiving a sensor data 202 from a range sensor, wherein the sensor data 202 comprises a plurality of sensor points received from the range sensor. A sensor point of the sensor data 202 may hereinafter be referred to by the variable $X_i$. The process flow 200 includes extracting a shape reconstruction 204 based on the sensor data 202. The shape reconstruction 204 may further be referred to as a current shape reconstruction to signify that the shape reconstruction 204 is computed based on sensor data 202 received in real-time for a range sensor. The shape reconstruction 204 is evaluated by the quality evaluation test 206. The result of the quality evaluation test 206 may hereinafter be referred to by the variable $Q_i$. The quality evaluation test 206 outputs a shape point flag 208 indicating whether a point in the shape reconstruction 204 is faulty or non-faulty. The quality evaluation test 206 further outputs a sensor point flag 210 indicating whether a raw sensor point of the sensor 202 is faulty or non-faulty. The shape point flag 208 may hereinafter be referred to by the variable $\xi_i$ and the sensor point flag may hereinafter be referred to by the variable $\varepsilon_i$. A best available shape 216 is retrieved from memory, and the best available shape 216 is fused with the sensor data 202 by the data fusion 212 process. In an embodiment, a vehicle controller determines that the best available shape 216 pertains to the same subject object of the shape reconstruction 204 based on, for example, location data from a global positioning system, or object recognition data from a machine learning process. Data fusion 212 outputs a shape data 214 including a plurality of shape points pertaining to the shape reconstruction 204. Additionally, the best available shape 216 is provided to the quality evaluation test 206 where the quality evaluation test 206 calculates a quality score for the shape reconstruction 204 by balancing a function of resulted variances of the shape reconstruction 204 and a similarity between the shape reconstruction 204 and the best available shape 216.

The sensor data 202 includes data received in real-time from a range sensor such as LIDAR sensor, a radar sensor, and any other suitable range sensors known in the art. The sensor data 202 includes a plurality of sensor data points $X_i$.

The shape reconstruction 204 process extracts a shape reconstruction 204 in real-time based on the sensor data 202. In an embodiment, the shape reconstruction 204 comprises a reconstruction of an object, and the best available shape 216 comprises a reconstruction of the same object across the time. The shape reconstruction 204 pertains to an object detectable by the range sensor and detectable within the sensor data 202. In an embodiment, shape reconstruction 204 is performed using implicit surface function, such as Gerardo-Castro implicit surface function according to Equation 1, below. (See Gerardo-Castro, M. P. (2015). "Non-parametric consistency test for multiple-sensing-modality data fusion. *IEEE Conference on Information Fusion*. Washington D.C.). In an embodiment, shape reconstruction 204 is performed using explicit surface function, such as Surazhsky explicit surface function. (See Surazhsky, V. a. (2003). Explicit surface remeshing. *Proceedings of the 2003 Eurographics/ACM Symposium on Geometry Processing*. San Diego: ACM.). It should be appreciated that shape reconstruction 204 may be performed by any suitable method known in the art.

$$f(X_i)=0 \rightarrow S_i \qquad \text{Equation 1}$$

where $f(X\_i)$ is a zero value function and $S\_i$ is the isosurface which represents the shape of the object.

The quality evaluation test 206 determines whether a point is faulty or non-faulty. The quality evaluation test follows a cost function defined by Equation 2, below. The variable $Q_i$ represents the quality score. The variable $C_\sigma$ represents a function of the resulted variances from the reconstruction of a shape. The variable $C_{geo}$ represents a measure of similarity between the shape reconstruction 204 and the best available shape 216, which can be expressed in terms of mutual information or spatial mutual information. The variable $W_1$ is a predefined weight.

$$Q_i = C_\sigma + C_{geo} \qquad \text{Equation 2}$$

$$C_\sigma = f(\sigma_i) \qquad \text{Equation 3}$$

$$C_\sigma = f(\sigma_i) = W_1 k = W_1 E\left(\frac{[f(X_i) = 0] - \mu}{\text{var}([f(X_i)+0])}\right)^4 \qquad \text{Equation 4}$$

Equations 3-4 illustrate a calculation of a function of the resulted variances from the shape reconstruction 204. In particular, the function of the resulted variances is defined as the kurtosis k of the mean given by a function that defines the shape of an object such as an implicit surface function or an explicit surface function, or a similar approach to recover a shape of an object k.

The variable $C_{geo}$ represents a measure of similarity between the shape reconstruction 204 and the best available shape 216, which can be expressed in terms of mutual information or spatial mutual information. The determination of the measure of similarity between the shape reconstruction 204 and the best available shape 216 is calculated according to Equation 5, below. The variable $W_2$ is a predefined weight; the variable H is a function of entropy for a variable; M is a current shape estimated from $X_i$; and $S_{i-1}$ is the best available shape 216 that is retrieved from memory.

$$C_{geo}=W_2 I(M_i,S_{i-1})=W_2 H(M_i)-H(M_i|S_{i-1}) \qquad \text{Equation 5}$$

The overall result $Q_i$ of the quality evaluation test 206 is calculated according to Equation 6, below.

$$Q_1 = W_1 E\left(\frac{[f(X_i)=0]-\mu}{\text{var}([f(X_i)+0])}\right)^4 + W_2 H(M_i) - H(M_i|S_{i-1}) \qquad \text{Equation 6}$$

The shape point flag 208 indicates if a point on the shape reconstruction 204 of the object is faulty or non-faulty. The shape point flag 208 is defined according to Equation 7, below. The variable threshold is a predefined threshold amount. When the quality is less than or equal to the predefined threshold, the data point on the shape reconstruction 204 is non-faulty and the shape point flag 208 is equal to zero. When the quality is greater than the predefined threshold, the data point on the shape reconstruction 204 is faulty and the shape point flag 208 is equal to one.

$$Q_i^j < \begin{array}{l} Q_i^j \leq \text{threshold} \rightarrow \xi_i^j = 0 \\ Q_i^j > \text{threshold} \rightarrow \xi_i^j = 1 \end{array} \qquad \text{Equation 7}$$

The sensor point flag 210 indicates if a sensor point of the sensor data 202 is faulty or non-faulty. The sensor point flag 210 is defined according to Equation 8, below. The function defined by Equation 8 computes the nearest neighbor from the point $X_i^k$ to the estimated shape representation, and then it takes the corresponding flag $\xi_i^j$ and assigns the same value to $\varepsilon_i^k$.

$$\varepsilon_i^k = P(S_i, \xi_i, X_i^k) \qquad \text{Equation 8}$$

The data fusion 212 estimates a fused shape reconstruction at a given time. The process of data fusion 212 includes selecting non-faulty points of the sensor data 202 to be fused with the best available shape 216 reconstruction retrieved from memory. Data fusion 212 utilizes a data fusion approach such as Gaussian Process Data Fusion, defined by Equation 9, below. The variable $S_{i-1}^*$ includes samples from the best available shape 216 at a previous time instance. The variable $X_{\varepsilon_f=0}$ includes the set of non-faulty points at the time instance. The variable DF represents a data fusion method. The outcome of data fusion 212 is a new best available shape that may be stored in memory for future retrieval.

$$S_i = DF(S_{i-1}^*, X_{\varepsilon_f=0}) \quad \text{Equation 9}$$

The shape data 214 constitutes the output $S_i$ of the data fusion 212 process. The shape data 214 constitutes a new best available shape that is stored in memory for future retrieval.

The best available shape 216 constitutes a prior shape reconstruction of the object that is based on prior sensor data and may be retrieved from memory. In an embodiment, the best available shape 216 includes a prior output $S_i$ of the data fusion 212 process. In an embodiment, the best available shape 216 comprises the fewest number of faulty points when compared with a plurality of available shape reconstructions stored in memory that each comprise the object.

In an embodiment of the process flow 200, the data is provided to a vehicle control system such as an automated driving/assistance system 102, and the data is utilized to determine and actuate a vehicle controller. For example, the best available shape 216 reconstruction may be provided to the vehicle controller to indicate that the vehicle should avoid the subject object of the best available shape 216.

Figure 3:
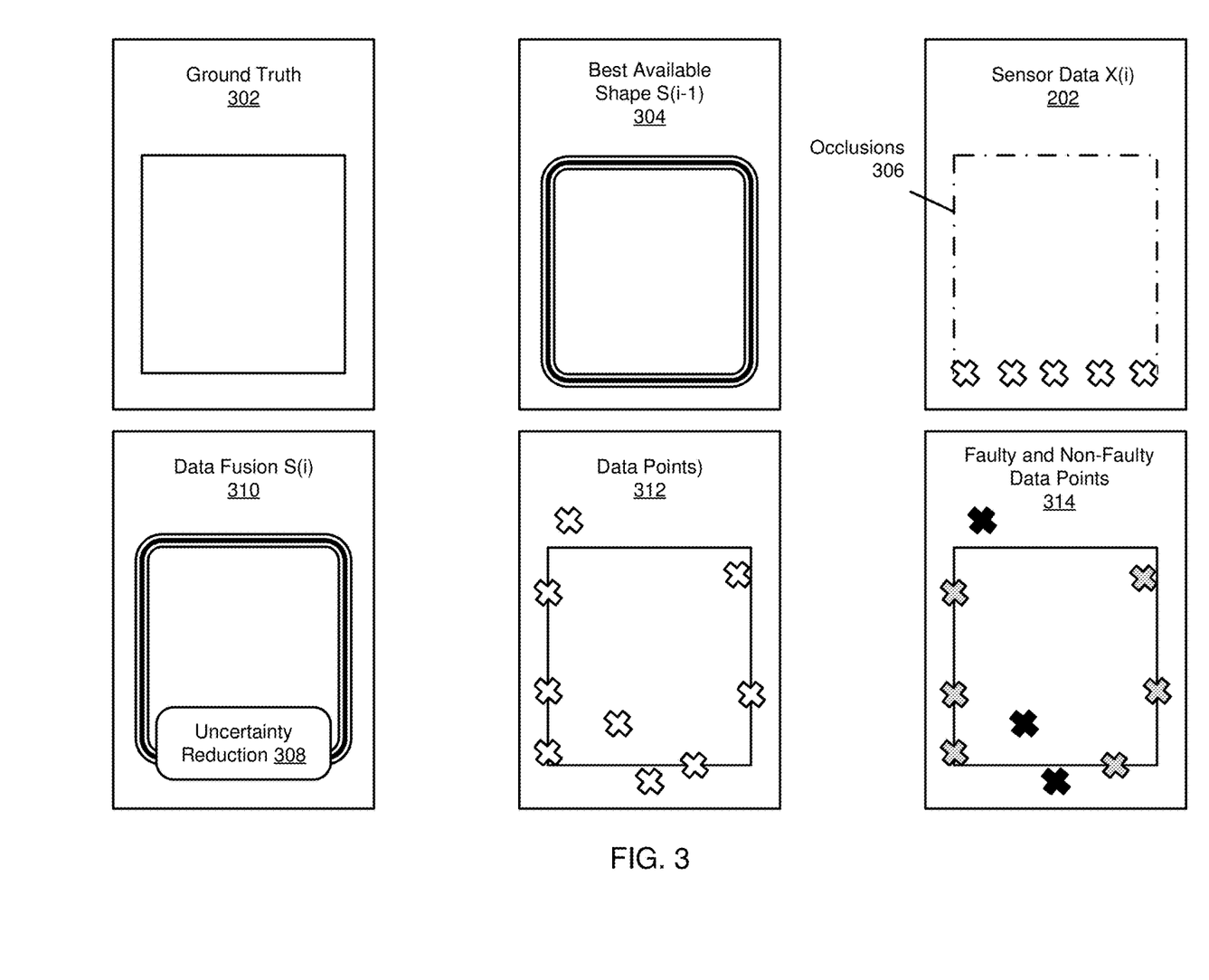
FIG. 3 illustrates various example outputs from a process for estimating a shape of an object and detecting a fault in a perception system, according to one implementation.

FIG. 3 illustrates a schematic diagram of example outputs from the present disclosure. Ground truth 302 is the basis from which other illustrations and shape reconstructions are formed. The sensor data 202 (represented as $X_i$) includes occlusions 306 (see the dotted line areas) that are not observed by the range sensor. The proposed systems, methods, and devices disclosed herein may overcome the occlusions 306 by using a best available shape 304 reconstruction retrieved from memory. As illustrated in FIG. 3, the best available shape 304 is illustrated as a black line with uncertainty illustrated as shaded grey. The data fusion result 310 (see the data fusion 212 process in FIG. 2) illustrates a region of uncertainty reduction 308, where the uncertainty seen in the sensor data 202 is replaced with data from the best available shape 304. The data points 312 represent a plurality of data points that may include sensor data 202 points and/or best available shape 304 data points. The faulty and non-faulty data points 314 represent a finding of faulty (see black marks) and non-faulty (see grey marks) points based on the data points 312.

Figure 4:
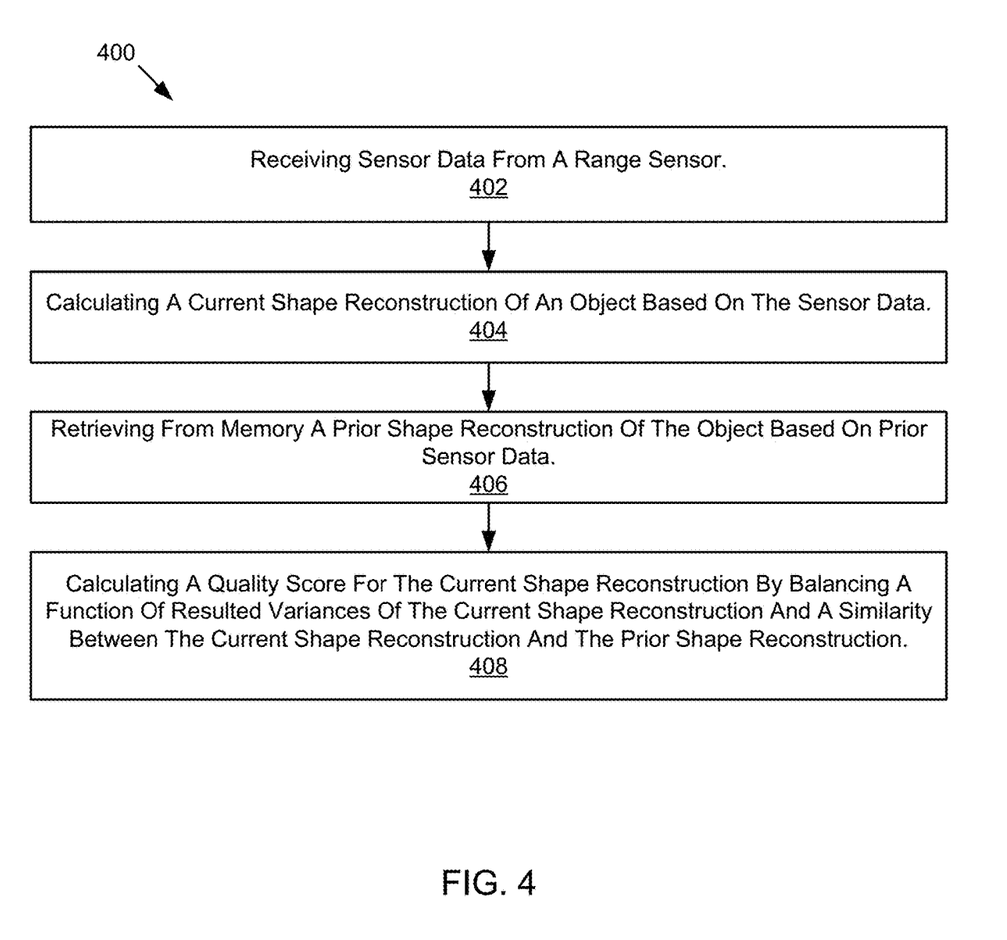
FIG. 4 illustrates a schematic flow chart diagram of a method for estimating a shape of an object, according to one implementation.

FIG. 4 illustrates a schematic flow chart diagram of a method 400 for diagnosing and/or detecting a faulty and failing perception system. The method 400 begins and a processor, such as an automated driving/assistance system 102, receives sensor data from a range sensor at 402. The processor calculates a current shape reconstruction of an object based on the sensor data at 404. The processor retrieves from memory a prior shape reconstruction of the object based on prior sensor data at 406. The processor calculates a quality score for the current shape reconstruction by balancing a function of resulted variances of the current shape reconstruction and a similarity between the current shape reconstruction and the prior shape reconstruction at 408.

Figure 5:
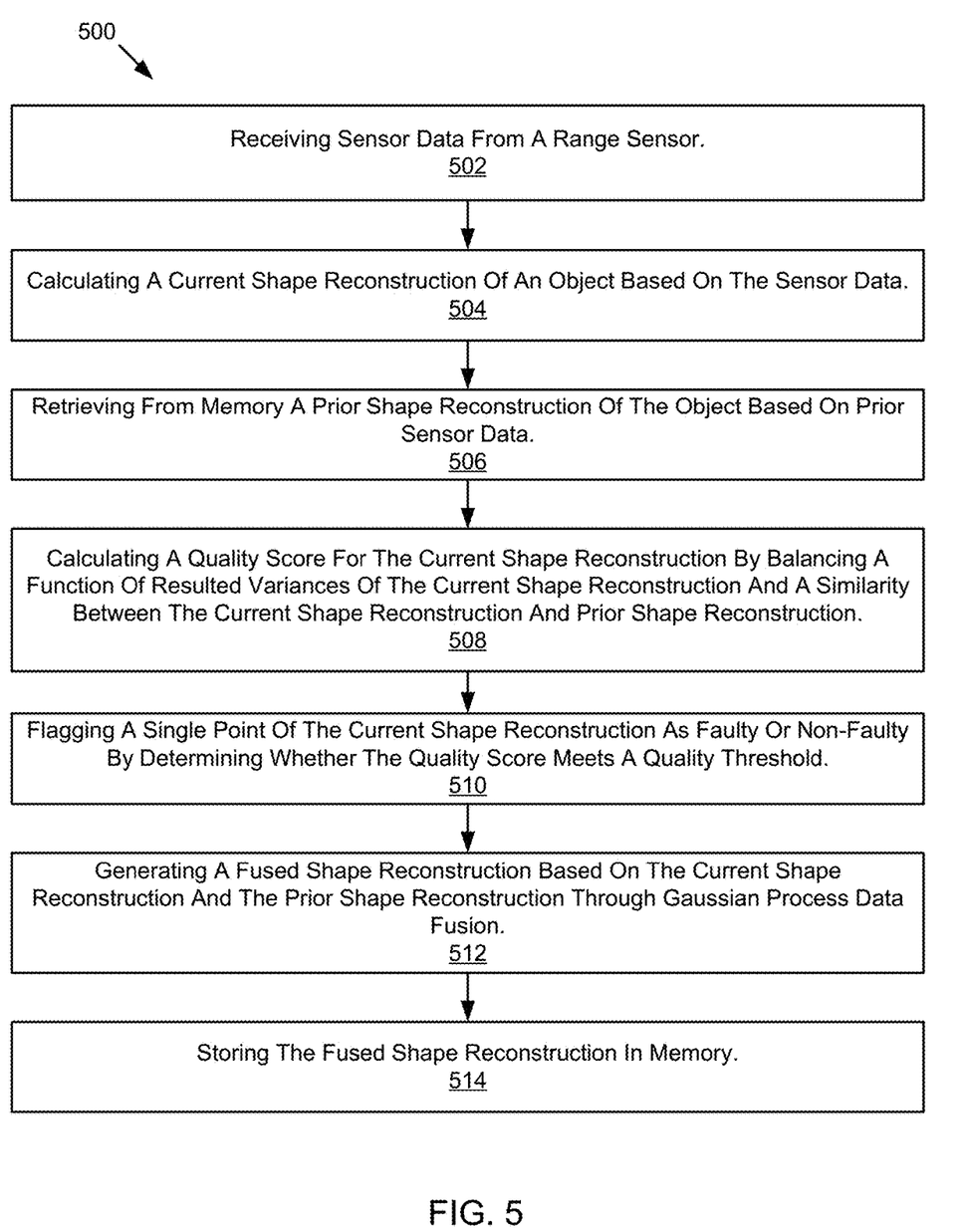
FIG. 5 illustrates a schematic flow chart diagram of a method for estimating a shape of an object, according to one implementation.

FIG. 5 illustrates a schematic flow chart diagram of a method 500 for diagnosing and/or detecting a faulty and/or failing perception system. The method 500 begins and a processor, such as an automated driving/assistance system 102, receives sensor data from a range sensor at 502. The processor calculates a current shape reconstruction of an object based on the sensor data at 504. The processor retrieves from memory a prior shape reconstruction of the object based on prior sensor data at 506. The processor calculates a quality score for the current shape reconstruction by balancing a function of resulted variances of the current shape reconstruction and a similarity between the current shape reconstruction and prior shape reconstruction at 508. The processor flags a single point of the current shape reconstruction as faulty or non-faulty by determining whether the quality score meets a quality threshold at 510. The processor generates a fused shape reconstruction based on the current shape reconstruction and the prior shape reconstruction through Gaussian Process Data Fusion at 512. The processor stores the fused shape reconstruction in memory at 514.

Figure 6:
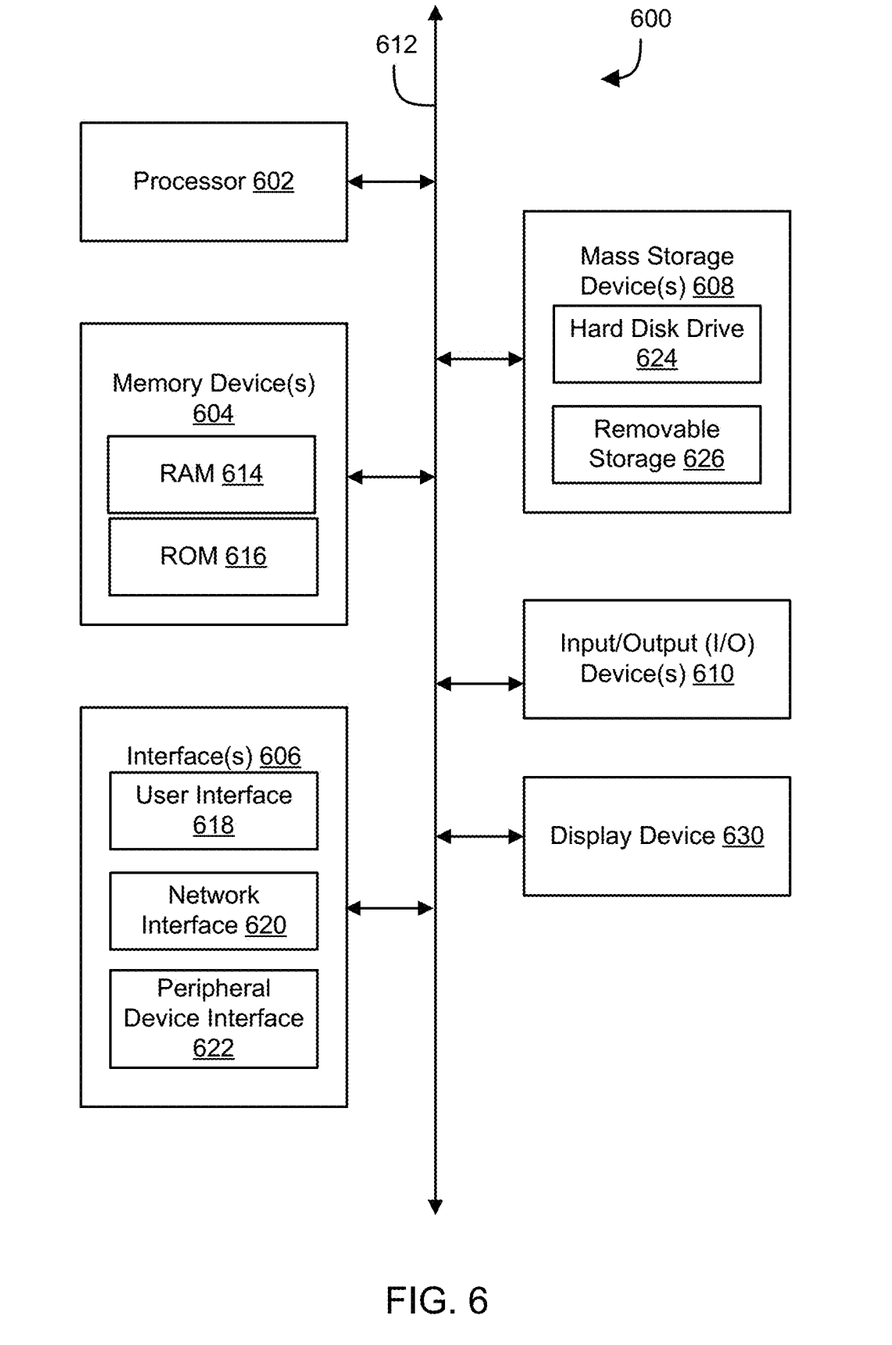
FIG. 6 is a schematic block diagram illustrating an example computing system, according to one implementation.

Referring now to FIG. 6, a block diagram of an example computing device 600 is illustrated. Computing device 600 may be used to perform various procedures, such as those discussed herein. In one embodiment, the computing device 600 is an automated driving/assistance system 102. Computing device 600 can perform various monitoring functions as discussed herein, and can execute one or more application programs, such as the application programs or functionality described herein. Computing device 600 can be any of a wide variety of computing devices, such as a desktop computer, in-dash computer, vehicle control system, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 may include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, or any suitable user interface now known to those of ordinary skill in the field, or later discovered), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 600 and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes: receiving sensor data from a range sensor; calculating a current shape reconstruction of an object based on the sensor data; retrieving from memory a prior shape reconstruction of the object based on prior sensor data; and calculating a quality score for the current shape reconstruction by balancing a function of resulted variances of the current shape reconstruction and a similarity between the current shape reconstruction and the prior shape reconstruction.

Example 2 is a method as in Example 1, further comprising identifying a presence of a faulty point in the current shape reconstruction by determining whether the quality score meets a quality threshold.

Example 3 is a method as in any of Examples 1—wherein a faulty point is present in the current shape reconstruction if the quality score is greater than the quality threshold and wherein a faulty point is not present in the shape reconstruction if the quality score is less than or equal to the quality threshold.

Example 4 is a method as in any of Examples 1-3, further comprising storing the current shape reconstruction in memory for future use if the quality score is less than or equal to the quality threshold.

Example 5 is a method as in any of Examples 1-4, wherein a faulty point is present in the current shape reconstruction and the faulty point is caused by an obstruction or occlusion to the range sensor.

Example 6 is a method as in any of Examples 1-5, wherein the similarity between the current shape reconstruction and the prior shape reconstruction is expressed in terms of mutual information or spatial mutual information.

Example 7 is a method as in any of Examples 1-6, wherein the function of resulted variances of the current shape reconstruction is defined as a kurtosis of a mean given by a function that defines a shape of the object as an implicit surface function or an explicit surface function.

Example 8 is a method as in any of Examples 1-7, further comprising flagging a single point of the current shape reconstruction as faulty or non-faulty by calculating a point quality score for the single point and determining whether the point quality score meets a point quality threshold.

Example 9 is a method as in any of Examples 1-8, further comprising generating a fused shape reconstruction based on the current shape reconstruction and the prior shape reconstruction.

Example 10 is a method as in any of Examples 1-9, wherein generating the fused shape reconstruction comprises: identifying a faulty point in the current shape reconstruction; identifying a non-faulty point in the prior shape reconstruction that corresponds to an approximate location of the faulty point in the current shape reconstruction; and replacing the faulty point in the current shape reconstruction with the non-faulty point in the prior shape reconstruction.

Example 11 is a method as in any of Examples 1-10, wherein generating the fused shape reconstruction comprises Gaussian Process Data Fusion.

Example 12 is a method as in any of Examples 1-11, wherein the prior shape reconstruction comprises a fewest number of faulty points compared with a plurality of unique shape reconstructions stored in memory that each comprise the object.

Example 13 is a method as in any of Examples 1-12, wherein calculating the quality score comprises evaluating a structure of the object and calculating an uncertainty and a coherence across the sensor data from one or more sensing modalities.

Example 14 is a method as in any of Examples 1-13, wherein the sensor data comprises a plurality of sensor observations in the form of points corresponding to two-dimensional or three-dimensional points at a time instance.

Example 15 is a method as in any of Examples 1-14, wherein the range sensor is attached to a vehicle and comprises one or more of a LIDAR sensor or a radar sensor.

Example 16 is non-transitory computer readable storage media storing instructions that, when executed by one or more processors, cause the one or more processors to: receive sensor data from a range sensor; calculate a current shape reconstruction of an object based on the sensor data; retrieve from memory a prior shape reconstruction of the object based on prior sensor data; and calculate a quality score for the current shape reconstruction by balancing a function of resulted variances of the current shape reconstruction and a similarity between the current shape reconstruction and the prior shape reconstruction.

Example 17 is non-transitory computer readable storage media as in Example 16, wherein the instructions cause the one or more processors to calculate the quality score by evaluating a structure of the object and calculating an uncertainty and a coherence across the sensor data from one or more sensing modalities.

Example 18 is non-transitory computer readable storage media as in any of Example 16-17, wherein the instructions further cause the one or more processors to identify a presence of a faulty point in the current shape reconstruction by calculating whether the quality score meets a quality threshold, wherein a faulty point is present in the current shape reconstruction if the quality score is greater than the quality threshold and wherein a faulty point is not present in the current shape reconstruction if the quality score is less than or equal to the quality threshold.

Example 19 is non-transitory computer readable storage media as in any of Example 16-18, wherein one or more of: the function of resulted variances of the current shape reconstruction is defined as a kurtosis of a mean given by a function that defines a shape of the object as an implicit surface function or an explicit surface function; or the similarity between the current shape reconstruction and the prior shape reconstruction is expressed in terms of mutual information or spatial mutual information.

Example 20 is non-transitory computer readable storage media as in any of Example 16-19, wherein the instructions further cause the one or more processors to generate a fused shape reconstruction based on the current shape reconstruction and the prior shape reconstruction by: identifying a faulty point in the current shape reconstruction; identifying a non-faulty point in the prior shape reconstruction that corresponds to the faulty point in the current shape reconstruction; and replacing the faulty point in the current shape reconstruction with the non-faulty point in the prior shape reconstruction.

Example 21 is a system or device that includes means for implementing a method or realizing a system or apparatus in any of Examples 1-20.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
    receiving sensor data from a range sensor, wherein the range sensor comprises one or more of LIDAR or radar;
    calculating a current shape reconstruction of an object based on the sensor data;
    retrieving from memory spatial parameters for a prior shape reconstruction of the object;
    calculating a quality score for the sensor data based on:
        a confidence score for the current shape reconstruction based on a function of resulted variances of the current shape reconstruction given by a function defining a shape of the object based on an implicit surface function or an explicit surface function; and
        a similarity between the current shape reconstruction and the prior shape reconstruction;
    generating a shape point flag identifying non-faulty points in the prior shape reconstruction that meet a quality threshold defined in terms of the quality score;
    generating a sensor point flag identifying non-faulty points in the sensor data; and
    fusing the shape point flag and the non-faulty points from the sensor point flag to generate a shape for the object that compensates for uncertainties and/or occlusions in the sensor data.

2. The method of claim 1, further comprising identifying a presence of a faulty point in the current shape reconstruction by determining whether the quality score for the sensor data meets the quality threshold.

3. The method of claim 2, wherein a faulty point is present in the current shape reconstruction if the quality score for the sensor data is greater than the quality threshold and wherein a faulty point is not present in the shape reconstruction if the quality score for the sensor data is less than or equal to the quality threshold.

4. The method of claim 3, further comprising storing the current shape reconstruction in memory for future use if the quality score for the sensor data is less than or equal to the quality threshold.

5. The method of claim 2, wherein a faulty point is present in the current shape reconstruction and the faulty point is caused by an obstruction or occlusion to the range sensor.

6. The method of claim 1, wherein the similarity between the current shape reconstruction and the prior shape reconstruction is expressed in terms of mutual information or spatial mutual information.

7. The method of claim 1, wherein the function of resulted variances of the current shape reconstruction is defined as a kurtosis of a mean given by a function that defines a shape of the object as the implicit surface function or the explicit surface function.

8. The method of claim 1, further comprising flagging a point of the current shape reconstruction as faulty or non-faulty by calculating a point quality score for the point and determining whether the point quality score meets a point quality threshold.

9. The method of claim 1, further comprising generating a fused shape reconstruction based on the current shape reconstruction and the prior shape reconstruction and storing the fused shape reconstruction in memory.

10. The method of claim 9, wherein generating the fused shape reconstruction comprises:
    identifying one or more non-faulty points in the current shape reconstruction;
    identifying one or more non-faulty points in the sensor data; and
    fusing the prior shape reconstruction with one or more of:
        the one or more non-faulty points in the current shape reconstruction; or
        the one or more non-faulty points in the sensor data.

11. The method of claim 9, wherein generating the fused shape reconstruction comprises Gaussian Process Data Fusion.

12. The method of claim 1, wherein retrieving from memory the spatial parameters for the prior shape reconstruction further comprises selecting the prior shape reconstruction from a plurality of unique shape reconstructions stored in memory that each comprise the object, wherein selecting the prior shape reconstruction comprises selecting based on a fewest number of faulty points.

13. The method of claim 1, wherein calculating the quality score for the sensor data represents a measure of similarity between the current shape reconstruction and the prior shape reconstruction.

14. The method of claim 1, wherein the sensor data comprises a plurality of sensor observations in the form of points corresponding to two-dimensional or three-dimensional points over a time period.

15. The method of claim 1, wherein the range sensor is attached to a vehicle.

16. Non-transitory computer readable storage media storing instructions for execution by one or more processors, the instructions comprising:
receiving sensor data from a range sensor, wherein the range sensor comprises one or more of LIDAR or radar;
calculating a current shape reconstruction of an object based on the sensor data;
retrieving from memory spatial parameters for a prior shape reconstruction of the object;
calculating a quality score for the sensor data based on:
a confidence score for the current shape reconstruction based on a function of resulted variances of the current shape reconstruction given by a function defining a shape of the object based on an implicit surface function or an explicit surface function; and
a similarity between the current shape reconstruction and the prior shape reconstruction;
generating a shape point flag identifying non-faulty points in the prior shape reconstruction that meet a quality threshold defined in terms of the quality score;
generating a sensor point flag identifying non-faulty points in the sensor data; and
fusing the shape point flag and the non-faulty point from the sensor point flag to generate a shape for the object that compensates for uncertainties and/or occlusions in the sensor data.

17. The non-transitory computer readable storage media of claim 16, wherein the instructions are such that the quality score for the sensor data represents a measure of similarity between the current shape reconstruction and the prior shape reconstruction.

18. The non-transitory computer readable storage media of claim 16, wherein the instructions further comprise identifying a presence of a faulty point in the current shape reconstruction by calculating whether the quality score for the sensor data meets a quality threshold, wherein a faulty point is present in the current shape reconstruction if the quality score for the sensor data is greater than the quality threshold and wherein a faulty point is not present in the current shape reconstruction if the quality score is less than or equal to the quality threshold.

19. The non-transitory computer readable storage media of claim 16, wherein one or more of:
the function of resulted variances of the current shape reconstruction is defined as a kurtosis of a mean given by a function that defines a shape of the object as the implicit surface function or the explicit surface function; or
the similarity between the current shape reconstruction and the prior shape reconstruction is expressed in terms of mutual information or spatial mutual information.

20. The non-transitory computer readable storage media of claim 16, wherein the instructions further comprise generating a fused shape reconstruction by:
identifying one or more non-faulty points in the current shape reconstruction;
identifying one or more non-faulty points in the sensor data; and
fusing the prior shape reconstruction with one or more of:
the one or more non-faulty points in the current shape reconstruction; or
the one or more non-faulty points in the sensor data.

* * * * *